United States Patent [19]

Thomason et al.

[11] Patent Number: 5,369,770

[45] Date of Patent: Nov. 29, 1994

[54] STANDARDIZED PROTECTED-MODE INTERRUPT MANAGER

[75] Inventors: Jon G. Thomason; Earle R. Horton, both of Redmond, Wash.

[73] Assignee: Microsoft Corporation, Redmond, Wash.

[21] Appl. No.: 970,290

[22] Filed: Nov. 2, 1992

[51] Int. Cl.⁵ .................................. G06F 9/42
[52] U.S. Cl. ...................... 395/725; 364/DIG. 1; 364/280.8; 364/254.5
[58] Field of Search .......................... 395/700, 725

[56] References Cited

U.S. PATENT DOCUMENTS

| | | | |
|---|---|---|---|
| 4,779,187 | 10/1988 | Letwin | 395/725 |
| 5,027,273 | 6/1991 | Letwin | 364/DIG. 1 |
| 5,121,501 | 6/1992 | Baumgartner et al. | 364/DIG. 1 |

OTHER PUBLICATIONS

"Hook Handler", IBM Technical Disclosure Bulletin, vol. 31, No. 2, Jul. 1988, pp. 126-127.

Primary Examiner—Thomas M. Heckler
Attorney, Agent, or Firm—Seed and Berry

[57] ABSTRACT

A hook manager for system interrupts allows hooks to be added and removed from an interrupt chain in any order. The hook manager may be realized as a dynamic-link library module and may include application program interface (API) functions that are called by application programs to add hooks and remove hooks on their behalf. The hook manager creates a standardized stack that is accessible by application programs and may be used by multiple types of application programs.

15 Claims, 18 Drawing Sheets

STANDARDIZED PROTECTED-MODE INTERRUPT MANAGER

TECHNICAL FIELD

The present invention relates generally to data processing systems and, more particularly, to a hook manager for system interrupts.

BACKGROUND OF THE INVENTION

An interrupt is a control transfer mechanism that causes a processor to stop execution of a current program and start execution of an interrupt handler. When the interrupt handler has completed handling of the interrupt, the processor resumes execution of the interrupted program. A distinction is often made between external interrupts and exceptions. An "external interrupt" is an interrupt that is caused by physical events that occur outside of the program currently being executed by the processor. An external interrupt is asynchronous with the program currently being executed. An "exception", in contrast, is caused by physical events that occur inside of the processor (i.e., internal events), and an exception is generally synchronous with the program that is currently being executed. Exceptions include "faults" and "traps". For purposes of simplicity, both an external interrupt and an exception will be referred to hereinafter as an "interrupt". The term "interrupt" is also used herein to encompass a software-generated interrupt.

It is often necessary for application programs to gain access to system interrupts. To enable the applications to gain access to the system interrupts, many operating systems provide "hooks". A hook is a mechanism that allows an application program to gain access to system interrupts.

The WINDOWS, version 3.0, graphical user interface sold by Microsoft Corporation of Redmond, Wash., is built upon an MS-DOS foundation. WINDOWS, version 3.0, also includes a DOS protected mode interface (DPMI). DPMI allows DOS applications to run on a processor in protected mode, such as found in 80286-based systems and 80386-based systems. When a WINDOWS application program seeks to gain access to system interrupts, it must rely on services provided by MS-DOS or DPMI to hook the system interrupts. One difficulty in hooking system interrupts using MS-DOS or DPMI services is that applications are only allowed to unhook themselves from the system interrupt chain (i.e., the sequential chain of applications requesting access to the interrupts) in the reverse order in which the applications were hooked into the system interrupt chain.

FIGS. 1a, 1b and 1c provide an illustration of how applications are hooked into the system interrupt chain using MS-DOS services. In FIGS. 1a–1c, it is supposed that the interrupt is generated in an 80386-based system. In fact, in the remainder of the discussion that follows, the focus will be on an 80386-based system. It should be realized that the present invention is equally applicable to 80286-based systems. FIG. 1a illustrates an instance wherein an application 12 does not yet have a hook into the interrupt chain. In FIG. 1a, an interrupt is directed to a location 14 within the MS-DOS system memory space 10 that holds a pointer. The pointer points to an interrupt handler 16 in the system space 10 for handling the interrupt.

In FIG. 1b, the application 12 has a hook into the interrupt chain so that the pointer in location 14 points to an interrupt handler 18 in the application 12. The hook allows the interrupt handler 18 of the application 12 to receive and service the interrupt. As shown in FIG. 1c, application 12 holds a pointer 20 to the old interrupt handler 16. The interrupt chain, thus, includes a hook that passes the interrupt to the application 12 and a hook that passes the interrupt to the old interrupt handler 16 in the system space 10.

An interrupt chain that is created in a fashion like that shown in FIGS. 1a, 1b and 1c may only be unhooked in reverse order. The interrupt chain cannot be readily traversed because the pointer 20 to the old interrupt handler 16 is held at a location that is not readily discernible outside the application.

A further problem found in environments, such as WINDOWS, version 3.0, is that the interrupts received from MS-DOS and the interrupts received from DPMI may not be handled by the same code because the parameters for the respective interrupt handlers differ.

An additional problem that is particular to conventional systems in which interrupts are hooked through DPMI services relates to the stacks that are employed within the data processing system. A stack is a last-in-first-out (LIFO) structure that is used by a processor to implement nested sub-routine calls, nested sub-routine returns and interrupts. In order to understand how the stack is used in implementing interrupts, it is helpful to consider an example of an interrupt in a 80386-based system.

Suppose that an application program is currently being executed by a processor. The application program is allocated a stack within the local memory that is provided for the program. In 80386-based systems, the stack is part of conventional memory, and the "current" stack is the one at SS:SP, where SS is the current value in the SS register and SP is the current value in the SP register. Further suppose that the application program is interrupted. The system then takes steps to transfer control to an interrupt handler routine. However, in order to be able to return to the application program after the interrupt has been handled, certain information is pushed onto the stack of the application program. The value of the FLAGS register at the time of the interrupt is pushed onto the stack of the application program. The FLAGS register holds status information for the processor. Values for the CS register and IP register are also pushed onto the stack. The values held in the CS register and the IP register depend upon the type of interrupt that has arisen. In addition, certain interrupts push an error code onto the application program stack.

When the interrupt is hooked by DPMI services, the stack is switched to a DPMI stack. The DPMI stack lacks the local variables and other state information that were on the application program stack. As such, the interrupt handler does not have ready access to these missing items. The missing items may be helpful in determining what caused the interrupt. A similar problem arises when the system is running in enhanced mode of WINDOWS, version 3.0. When the system is running in WINDOWS, version 3.0, enhanced mode, the interrupt automatically causes the system to switch to a system stack that, likewise, does not include the local variables and other information that was held on the application program stack.

SUMMARY OF THE INVENTION

It is, therefore, an object of the present invention to provide an improved hook manager for system interrupts.

It is an additional object of the present invention to provide a system that allows hooking and unhooking of system interrupts in any order.

It is a further object of the present invention to provide state information, such as local variables, that is useful in servicing interrupts on a stack of an interrupt handler.

The foregoing and other objects, which will become more apparent to those skilled in the art in view of the detailed description provided below are realized by the present invention. In accordance with a first aspect of the present invention, a method is practiced in a data processing system having a memory for holding a dynamic-link library and a user stack that is used by an application program. The data processing system also includes a processor for executing the application program. In accordance with the method, a hook manager is provided in the dynamic link library for managing hooking and unhooking of system interrupts. A first interrupt is hooked to the hook manager. The stack is manipulated so that the stack may be used by any of the application programs that are executed by the processor. The first interrupt is then passed to the application programs.

The step of manipulating the stack may involve copying additional information into the stack. Furthermore, the hook manager may include an application program interface (API) that is called by the application programs to start receiving system interrupts and an API that is called by the application programs to stop receiving system interrupts.

In accordance with an additional aspect of the present invention, a method is practices in the data processing system. In this method, an executing application program is interrupted with a system interrupt. The data processing system then determines the type of the system interrupt and determines a first interrupt handler on a system interrupt chain to receive the system interrupt. Further, the system determines the second interrupt handler on the system chain to receive the system interrupt if the first interrupt handler returns the system interrupt. The type of system interrupt and an address for accessing the second interrupt handler are stored on a stack of the first interrupt handler. As such, the first interrupt handler knows the type of interrupt that has occurred and knows an address for accessing the second interrupt handler on the system interrupt chain. The data processing system then passes the system interrupt to the first interrupt handler.

In accordance with this method, an additional step of providing a hook manager may be included in this method. The hook manager includes a function that may be called to add an interrupt handler to the system interrupt chain. The function may be an application program interface (API), and the hook manager may be a dynamic-link library module. The method may also include the additional step of removing the first interrupt handler from the system interrupt chain. Still further, the method may include additional steps of returning the system interrupt from the first interrupt handler and passing the system interrupt to the second interrupt handler.

In accordance with another aspect of the present invention, a method is practiced in a data processing system that runs an operating system and first and second application programs. In accordance with this method, a hook manager is provided in a dynamic link library for managing hooking and unhooking of interrupts by the application programs. The hook manager maintains a chain of hooks. A hook for the first application program is added to the hook chain using the hook manager. Subsequently, a hook for the second application program is added to the hook chain using the hook manager. The hook for the first application is unhooked from the hook chain using the hook manager, and subsequently, the hook for the second application program is unhooked from the hook chain using the hook manager.

In accordance with yet another aspect of the present invention, a method is run in a data processing system that is running an operating system and applications programs. In accordance with this method, a hook manager is provided in the dynamic-link library for managing hooking and unhooking of system interrupts by the application programs. A chain of hooks is built using the hook manager in response to requests by the application programs to receive system interrupts. The hook is built in sequential order based on when the requests are received. The hooks are unhooked in a non-last-in-first-out (non-LIFO) fashion.

In accordance with still another aspect of the present invention, a method is practiced in a data processing system having a processor and registers. In accordance with this method, an application program running on the processor is interrupted with a system interrupt. The interrupt is then hooked to a hook manager through system services. A stack for storing information is associated with the system services. State information for the application program is copied to the system services stack using the hook manager. The state information for the application program is then copied from the system services stack to a stack for a first interrupt handler. The system interrupt is then passed to the first interrupt handler.

The step of copying the state information for the application program to the system services stack may include the step of copying values of the registers to the system services stack. Likewise, the copying step may include the step of copying values of local variables for the application program for the system services stack. The method may additionally include the step of providing a system interrupt chain of interrupt handlers that wish to receive system interrupts. This interrupt chain includes the first interrupt handler.

BRIEF DESCRIPTION OF THE DRAWINGS

A preferred embodiment of the present invention will be described below with reference to the drawings.

FIG. 5b depicts a structure of an entry within the table of FIG. 5a.

DETAILED DESCRIPTION OF THE INVENTION

A preferred embodiment of the present invention provides a hook manager for managing hooks of system interrupts for application programs. The hook manager allows applications to hook and unhook from a system interrupt chain in any order. The hooks need not be unhooked in reverse order, as required by the conventional system discussed above. The hook manager also generates a standardized stack frame holding state information that may be used by the application programs which seek access to system interrupts.

Figure 1A:
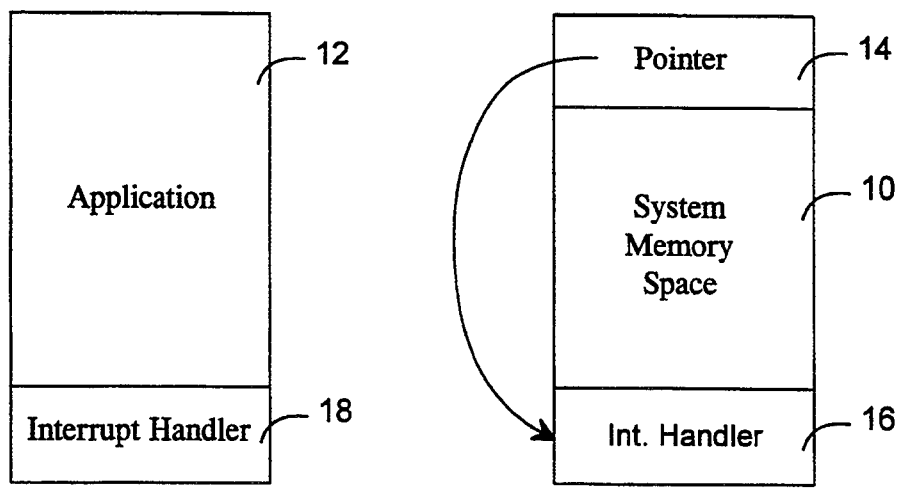
FIGS. 1a–1c depict how system interrupts are hooked by conventional MS-DOS services.
Figure 1B:
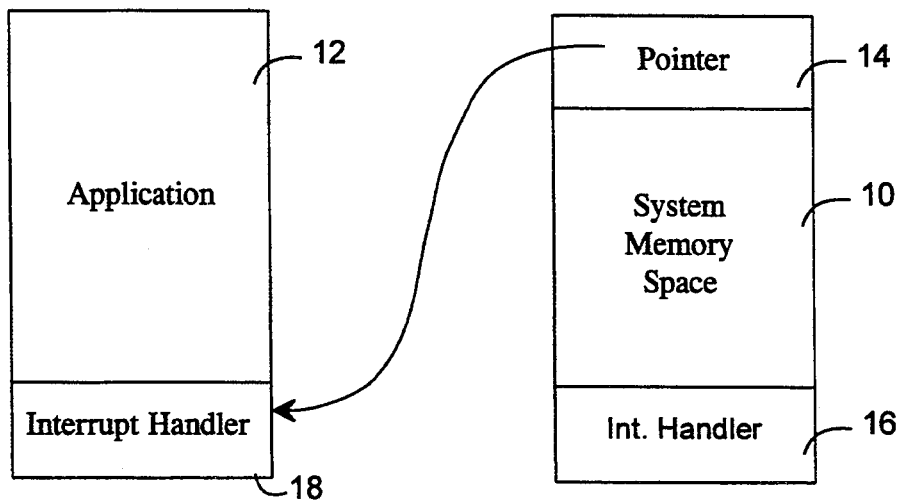
Figure 1C:
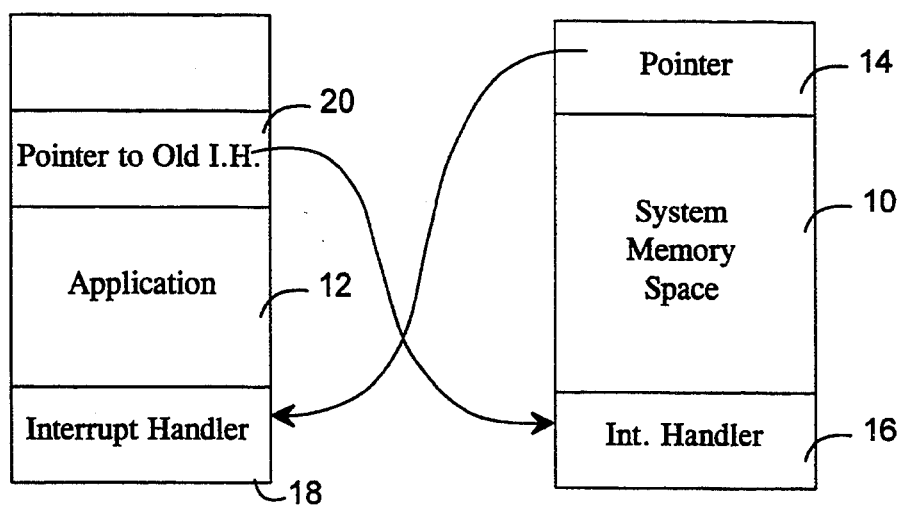
Figure 2:
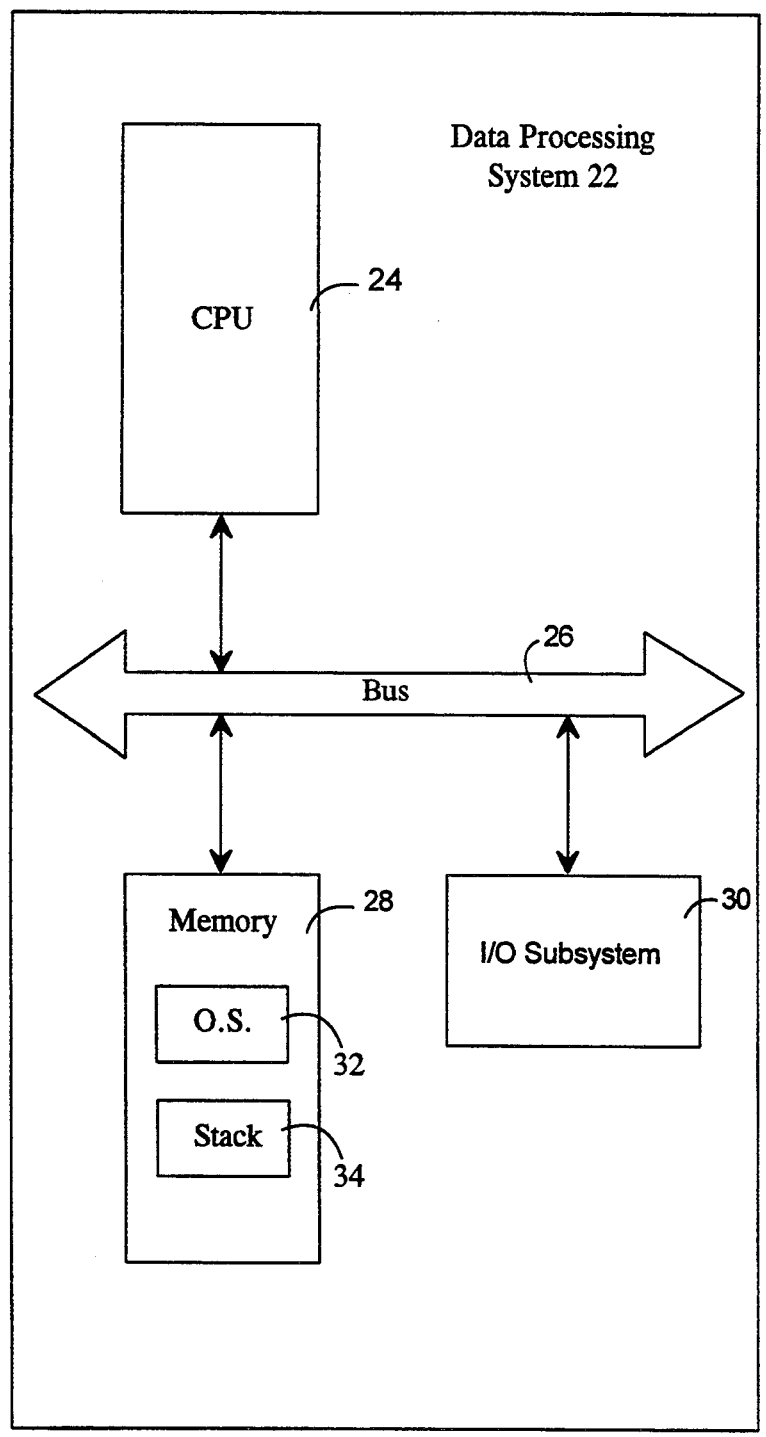
FIG. 2 depicts an illustrative data processing system in which the preferred embodiment of the present invention described herein may be implemented.

The preferred embodiment of the present invention described herein may be implemented on a data processing system 22, like that shown in FIG. 2. Those skilled in the art will appreciate that the data processing system 22 depicted in FIG. 2 is merely illustrative and that the present invention may be implemented with other data processing system configurations. The data processing system 22 of FIG. 2 includes a central processing unit (CPU) 24 (such as an 80386 microprocessor or an 80286 microprocessor), a memory 28 and an input/output (I/O) subsystem 30. The CPU 24, the memory 28 and the I/O subsystem 30 communicate with each other through a bus 26. The memory 28 holds an operating system 32 and at least one stack 34.

The hook manager of the preferred embodiment described herein may be implemented in an environment, such as WINDOWS, version 3.1, as a dynamic-link library (DLL). A dynamic-link library is an executable module containing functions that applications can call to perform tasks. The hook manager of the preferred embodiment described herein may be implemented as part of a debugger library in a system dynamic-link library. The debugger library provides tools that aid a programmer in debugging an application program.

The tool manager of the preferred embodiment described herein includes two application program interface (API) functions. An API is a set of routines that an application program may call to request and carry out services that are performed by the operating system. An API serves as an interface between the application program and the operating system. The two APIs used by the tool manager are "InterruptRegister" and "InterruptUnRegister".

InterruptRegister is called by an application program to signal that the application program would like to receive all system interrupts that are available to it. Hence, InterruptRegister serves to create a hook for an application program to receive system interrupts. InterruptRegister is implemented as a boolean function that returns a non-zero value if a hook on the system interrupt chain has been obtained and returns a zero value if a hook has not been obtained. The InterruptRegister function has two parameters: "htask" and "lpfnIntCallback". The htask parameter identifies the task (i.e., application program) that is registering a callback routine. A callback routine is a procedure that receives the system interrupts when one is generated. The lpfnIntCallback parameter identifies the interrupt callback routine (i.e., the interrupt handler in the application) that is being registered.

The InterruptUnRegister function is called by the application program to signal that the application program no longer wants to receive interrupts. In other words, InterruptUnRegister removes a hook for the application program from the interrupt chain. Like the InterruptRegister function, the InterruptUnRegister function is a boolean function that returns a non-zero value if the hook has been successfully removed from the interrupt chain and returns a zero value if the hook has not been successfully removed from the interrupt chain. The InterruptUnRegister function has only one parameter: "htask". The htask parameter identifies the task (i.e., the application program) that is requesting that the hook be removed.

Figure 3:
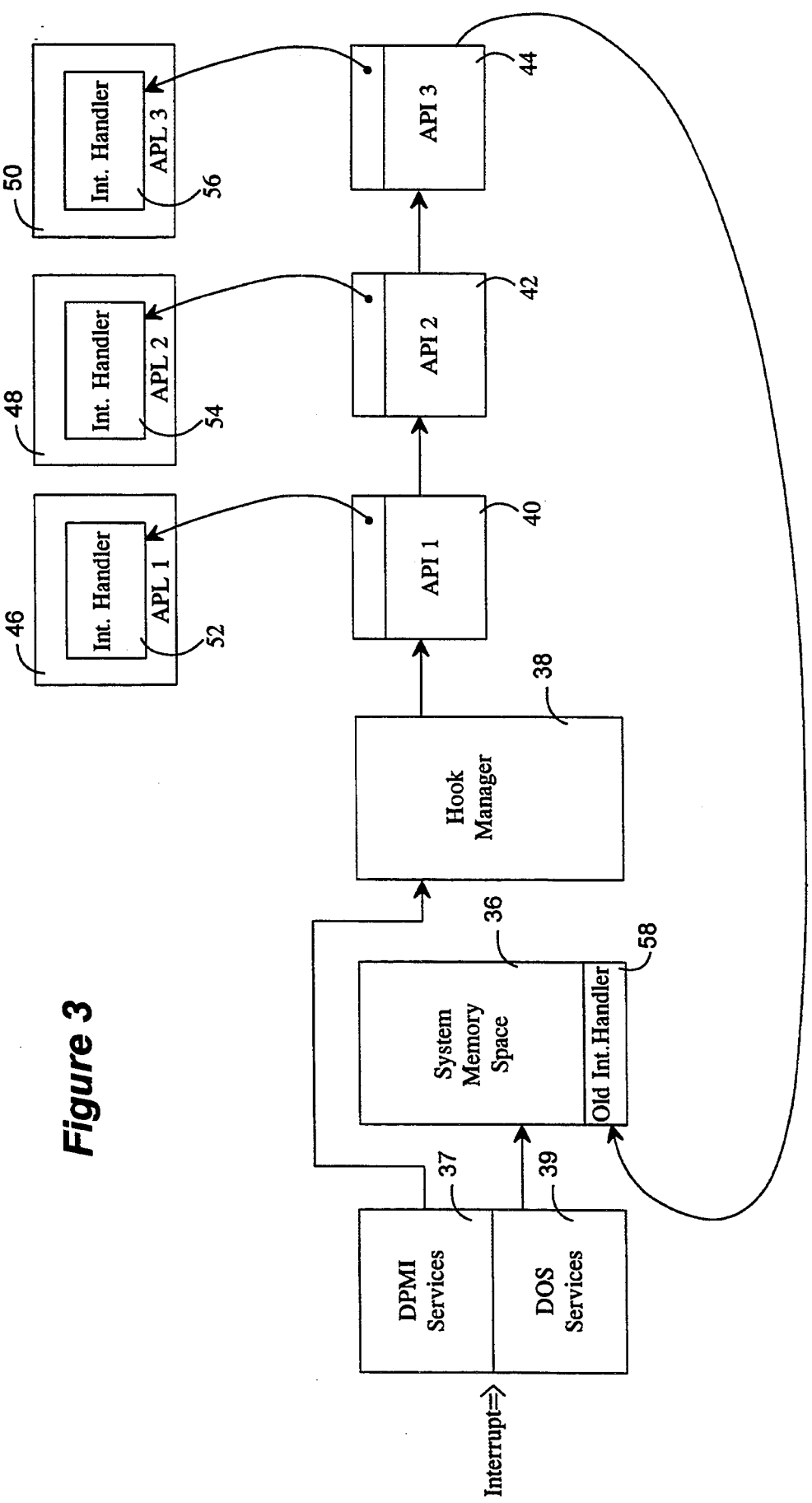
FIG. 3 depicts the handling of interrupts in the preferred embodiment of the present invention described herein.

As a result of calls to the InterruptRegister and InterruptUnRegister functions by application programs, a system interrupt chain is built, like that shown in FIG. 3. Specifically, a hook manager 38 creates a singly linked list having entries 40, 42 and 44. Each of the entries 40, 42 and 44 includes an identifier that specifies the application program 46, 48 or 50 requesting the hook (i.e., APL1, APL2 or APL3). Each entry 40, 42 and 44 also includes a pointer to an entry point in a respective interrupt handler 52, 54 and 56 within the respective application programs 46, 48 and 50. The last entry 44 on the linked list points to an old interrupt handler 58 within a system memory space 36. The old interrupt handler 58 is executed when the interrupt handlers 52, 54 and 56, to which the other entries 40, 42 and 44 point, decide to pass the interrupt down the system interrupt chain.

The hook manager 38 is hooked onto the beginning of the system interrupt chain so that the hook manager receives all system interrupts before the application programs 46, 48 and 50 receive the system interrupts. The hook manager 38 performs processing, as will be described below, prior to passing an interrupt down the system interrupt chain. In the preferred embodiment described herein, a single system interrupt chain is maintained for all system interrupts. Those skilled in the art will appreciate that separate interrupt chains may be maintained for different types of system interrupts. In such an instance, the hook manager 38 must maintain each of the interrupt chains and is hooked as the first entry in each of the interrupt chains. Only a single system interrupt chain for all system interrupts is shown in FIG. 3 for purposes of clarity and simplicity.

Figure 4:
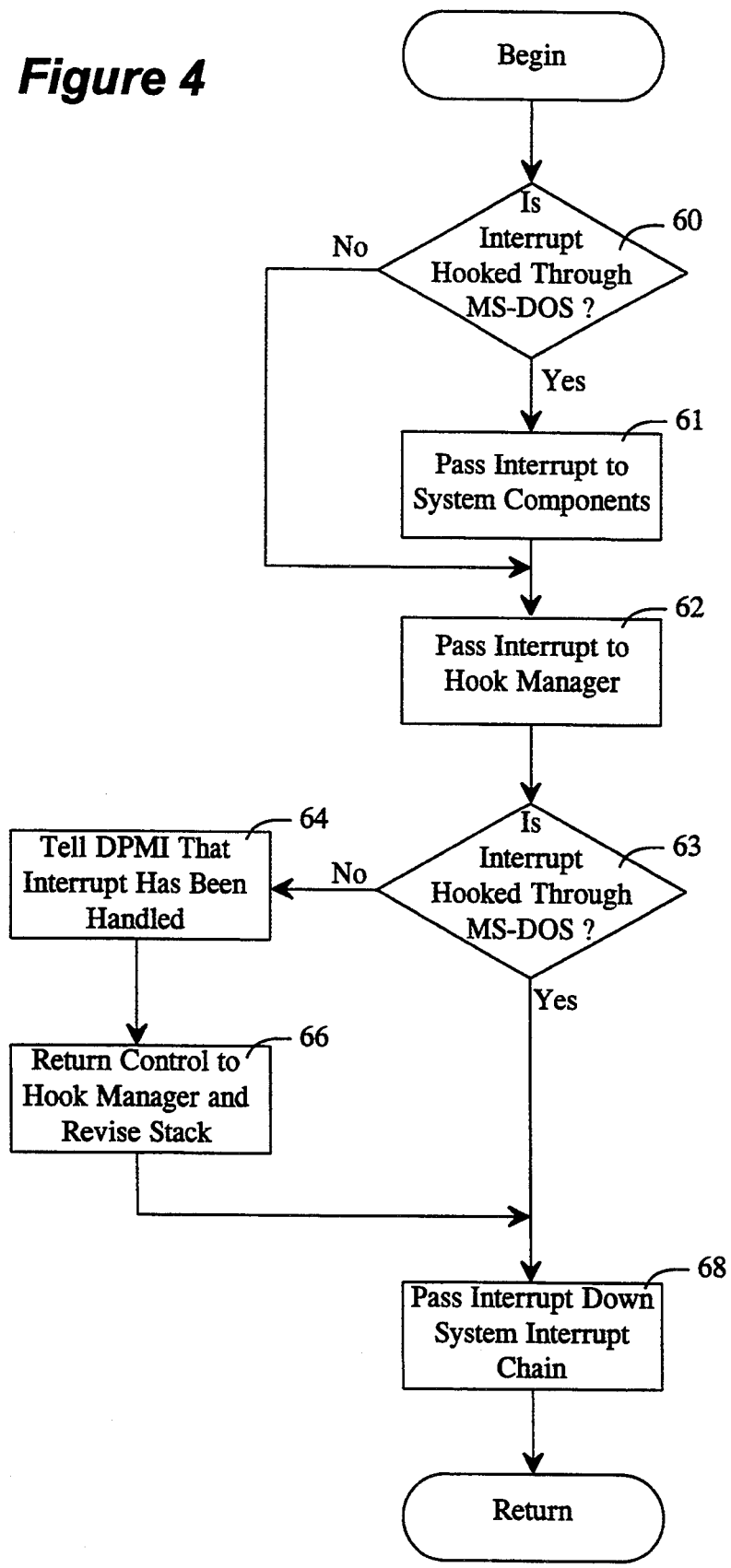
FIG. 4 is a flowchart providing an overview of the steps performed by the preferred embodiment of the present invention described herein.

FIG. 4 shows a flowchart that sets forth an overview of the steps performed by the preferred embodiment described herein when a system interrupt is generated. The details of these steps will be described below. Suppose that the interrupt is generated while an application program is executing. The interrupt must be hooked by either DPMI services 37 or MS-DOS services 39 (FIG. 3). In 80386 -based systems, only single step interrupts (i.e., INT 1) and breakpoint interrupts (i.e., INT 3) are hooked through MS-DOS services 39. MS-DOS services 39 pass the interrupt to system components within the system memory space 36 (see steps 60 and 61 in FIG. 4) before the interrupt is passed to the hook manager (step 62). The other system interrupts are hooked through DPMI services 37 (FIG. 3), which pass the interrupt directly to the hook manager 38 (see steps 60 and 62 in FIG. 4).

If the interrupt has been hooked through DPMI services 37 (FIG. 3), the hook manager 38 tells DPMI services that the interrupt has been handled (step 64 in FIG. 4). DPMI services then relinquish control to the hook manager 38, and the hook manager is then free to revise the stack (i.e., the stack that is used by the interrupt handler) into a standardized stack (step 66 in FIG. 4). The hook manager 38 (FIG. 3) then passes the interrupt down the system interrupt chain (step 68 in FIG. 4). Each interrupt handler on the system interrupt chain has the option of handling the interrupt or passing the interrupt to the next interrupt handler on the system interrupt chain.

Figure 5A:
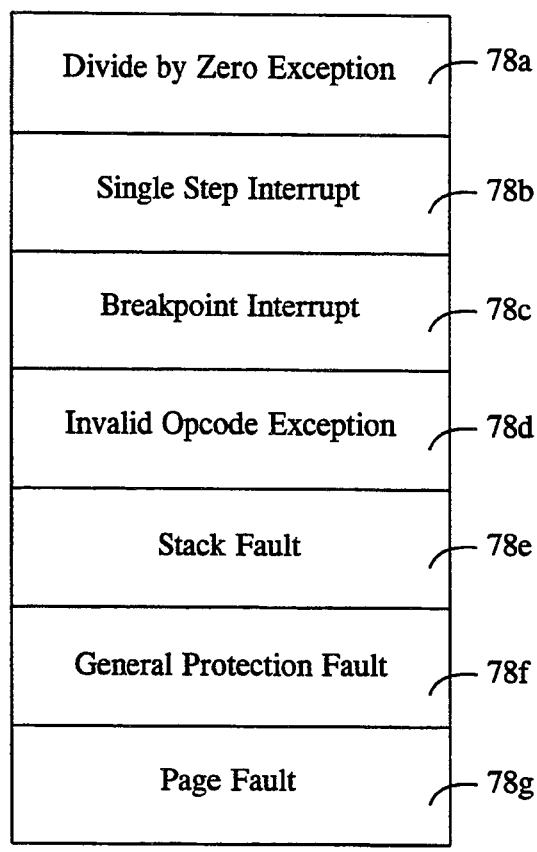
FIG. 5a depicts a table used by the hook manager of the preferred embodiment described herein during initialization.

When an interrupt is passed to the hook manager (see step 62 in FIG. 4), the operating system 32 (FIG. 2) knows the type of interrupt and the entry point in the hook manager for this type of interrupt. During initialization, the hook manager 38 (FIG. 3) hooks each type of interrupt separately to a unique entry point in the hook manager that is appropriate for the type of interrupt. In determining entry points, the hook manager sequentially scans an INT_INFO table 76 (FIG. 5a), which includes an entry for each type of interrupt. The INT_INFO table 76 includes entry 78a for divide by zero exceptions, entry 78b for single step interrupts, entry 78c for breakpoint interrupts, entry 78d for invalid opcode exceptions, entry 78e for stack faults, entry 78f for general protection faults and entry 78g for page faults.

Figure 5B:
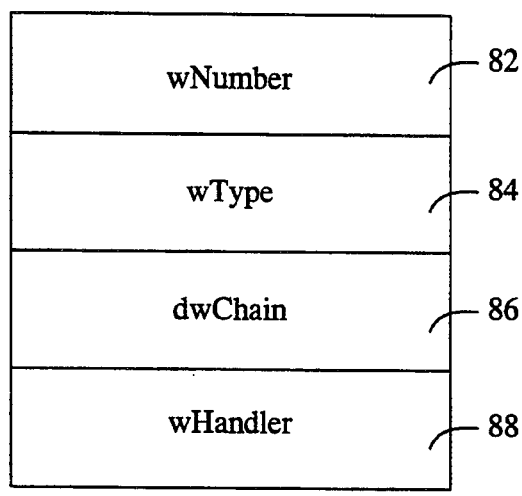

Each entry in the INT_INFO table 76 (FIG. 5a) holds an INT_INFO structure 80, like that shown in FIG. 5b. Each $INT_{13}$ INFO structure 80 holds a number of different fields: a wNumber field 82, a wType field 84, a dwChain field 86 and a wHandler field 88. The wNumber field 82 holds an index key specifying the type of interrupt. The wType field 84 holds a bit that specifies whether the interrupt was hooked by DOS services or DPMI services, and the dwChain field 86 points to the old interrupt handler 58 (FIG. 3) in system memory space 36. The wHandler field 88 (FIG. 5b) specifies an offset that is used as a means for designating the entry point within the hook manager 38 (FIG. 3) for a code segment that is selected based on the type of interrupt.

In scanning the INT_INFO table 76 (FIG. 5a), the preferred embodiment described herein examines the wNumber field 82 for each of the entries 78a–78g in the table 76 to find a match. The offset specified within the wHandler field 88 (FIG. 5b) is used as an entry point into a master fault handler portion of the hook manager for the corresponding type of interrupt. The master fault handler portion of the hook manager includes separate portions of offset code for each type of system interrupt and also includes a common code section for all types of system interrupts.

Figure 6:
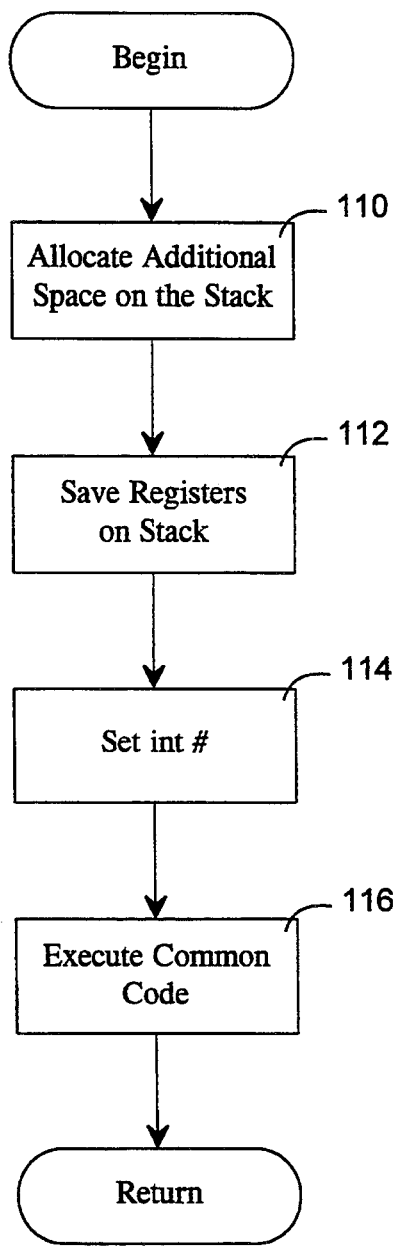
FIG. 6 is a flowchart depicting the steps performed by interrupt-type specific code segments of a master fault handler in the hook manager of the preferred embodiment described herein.

FIG. 6 depicts the steps performed by the offset portions of code segments of the master fault handler that are particular to a given interrupt type (i.e., not common). Specifically, in each such portion of code, the hook manager 38 (FIG. 3) allocates additional space on the (MS-DOS or DPMI) stack of the services that hooked the interrupt (step 110 in FIG. 6). The values in the registers of the CPU 24 (FIG. 2) are then stored in this newly allocated stack space (step 112 in FIG. 6). The registers are stored to preserve the state of the processor so that this state may be returned to later. The newly allocated space is also necessary create a stack frame on the user stack when the interrupt is hooked through MS-DOS services. If the interrupt is hooked through DPMI services, the extra unused space that has been allocated on the stack is removed, as will be described below. An integer value for a variable "Int#" is then set to designate the type of interrupt (step 114). The integer value varies, depending on the type of system interrupt. The system then may look to the value of Int# if it needs to know the interrupt type in the future. Once Int# has been set to the appropriate value (step 114), the common code portion of the master fault handler is executed (step 116). Each interrupt, regardless of type, invokes the execution of the common code portion of the master fault handler.

Figure 7:
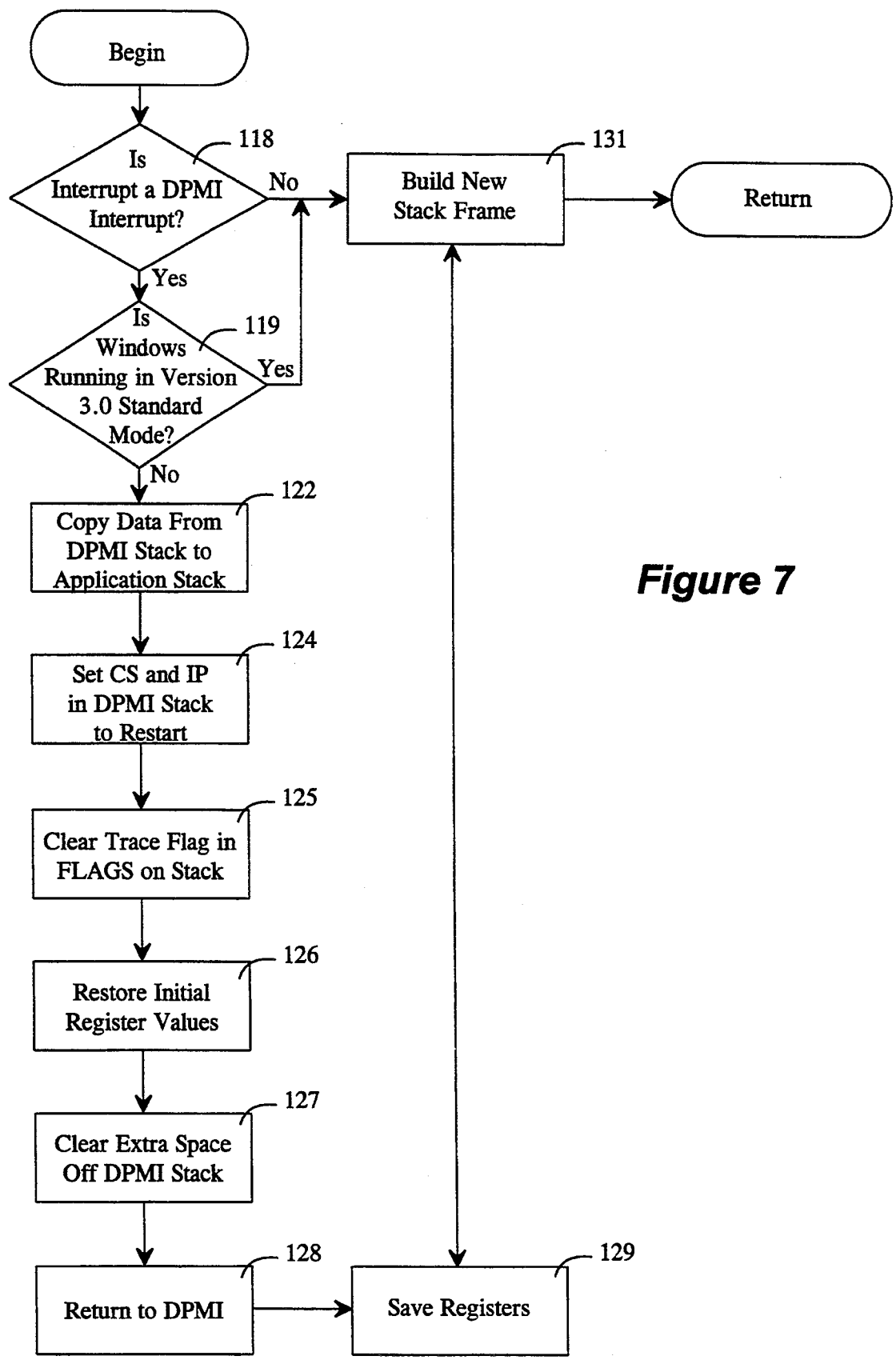
FIG. 7 is a flowchart depicting the initial steps performed by the common code portion of the master fault handler of the hook manager of the preferred embodiment described herein.

FIG. 7 sets forth the steps performed by the common code portion of the master fault handler of the hook manager. Initially, the common code portion of the master fault handler determines whether the interrupt was hooked via DPMI services 37 (FIG. 3) or via MS-DOS services 39 (step 118 in FIG. 7). If the interrupt was hooked via DPMI services, certain additional operations are required that are not required if the interrupt was hooked via MS-DOS services. In particular, the hook manager must take steps to ensure that a stack with the information needed by the interrupt handler on it is available to the interrupt handlers. The hook manager then checks to see whether the processor is currently running WINDOWS, version 3.0, in standard mode (step 119 in FIG. 4). When WINDOWS, version 3.0, standard mode is being run, many of the steps that will be described below are not required.

Figure 8:
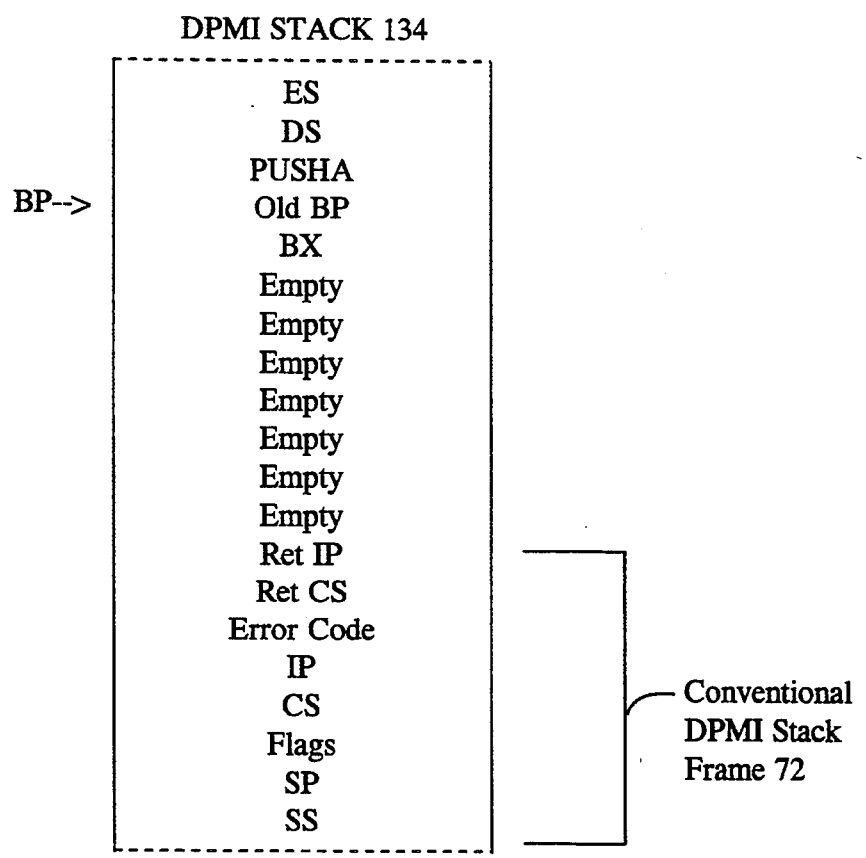
FIG. 8 depicts an example DPMI stack that is used in the preferred embodiment described herein.

If the interrupt was hooked through DPMI services 37 (FIG. 3) and the data processing system 22 (FIG. 2) is not running WINDOWS, version 3.0, standard mode, the hook manager 38 (FIG. 3) proceeds to copy data from a DPMI stack to the application program stack (step 122 in FIG. 7). In this instance, the system interrupt was hooked through DPMI services. The DPMI stack 134, at this point, appears as shown in FIG. 8. The register values (i.e., ES and DS) have all been pushed onto the DPMI stack 134, as described above with regard to the non-common code segments of the hook manager 38 (FIG. 3). Specifically, when the code segments in the hook manager that are particular to the type of interrupt were executed, space was allocated on the DPMI stack 134 and the registers were stored on the space (see steps 110 and 112 in FIG. 6). The old value of the base pointer (old BP) before the registers were stored on the DPMI stack 134 is also stored on the DPMI stack. The old BP points to the base of the DPMI stack 134 prior to the allocation of additional space. Storing the old BP on the DPMI stack 134 allows the DPMI stack to return to its previous state once the registers have been restored, as will be described in more detail below. The current base pointer (BP) points to the old BP value as the base or bottom of the stack (see FIG. 8).

A value of the BX register is stored on the DPMI stack 134. The value of the BX register points to the proper INT_INFO structure 80 (FIG. 5b) for the type of interrupt that has occurred. The DPMI stack 134 holds a conventional DPMI stack frame 72 that includes the upper eight words of the DPMI stack (i.e., "SS" through "Ret IP"). The remainder of the information on the stack is added by the preferred embodiment described herein. The conventional DPMI stack frame 72 includes the IP and CS register values that are to be used upon return to the application program (see "Ret IP" and "Ret CS" in FIG. 8). The significance of the return IP and CS register values depends upon the type of interrupt. These values are stored on the stack 134 so as to enable the application to restart the application program at a point that is appropriate after the interrupt has been handled.

The conventional DPMI stack frame 72 may additionally hold an error code, as shown in FIG. 8. The type of interrupt that has occurred determines whether an error code is pushed onto the stack. The current values for the IP register and the CS register are also pushed onto the conventional DPMI stack frame 72. Similarly, the value of the FLAGS register is pushed onto the conventional DPMI stack frame 72. Lastly, the conventional DPMI stack frame 72 holds the stack pointer (SP) register value and stack segment (SS) register value for the user stack. By using the SS and SP register values, the application stack may be located and restored upon return to the application program. The Ret IP, Ret CS, error code, IP, CS, FLAGS, SP and SS values are loaded onto the conventional DPMI stack frame 72 by the interrupt facility.

Before the hook manager 38 (FIG. 3) returns control to DPMI services 37, it creates a stack frame on the user stack which can be later utilized by the application programs. Thus, the hook manager seeks to preserve the stack information that will be needed later so that the information may be used in a reentrant fashion. The hook manager proceeds to fool the DPM2 services into believing that the interrupt has been fully handled. In order to fool the DPMI services that the interrupt has been fully handled and to ensure that execution restarts at the proper point, the hook manager performs the remaining steps shown in the flowchart of FIG. 7.

First, the state information (i.e., the registers values) from the DPMI stack 134 (FIG. 8) that lies above the bottom of the stack (as specified by BP in FIG. 8) is copied into the user stack (step 122 in FIG. 7). Then the hook manager 38 (FIG. 3) sets the CS and IP values in the DPMI stack 134 (FIG. 8) to point to a restart point in the hook manager (step 124 in FIG. 7). The hook manager resumes execution at the restart point when DPMI returns to the hook manager. The hook manager clears the trace flags in the FLAGS register value held on the DPMI stack (step 125) to prevent further spurious trace interrupts. The register values that were previously loaded onto the DPMI stack are then restored, so as to recreate the initial state of the DPMI services before the DPMI services called the hook manager (step 126 in FIG. 7). Furthermore, the hook manager clears off any extra empty space from the DPMI stack that is not needed for DPMI-hooked interrupts (step 127). Having restored the initial state, the hook manager then returns to the DPMI services (step 128 in FIG. 7).

Figure 9:
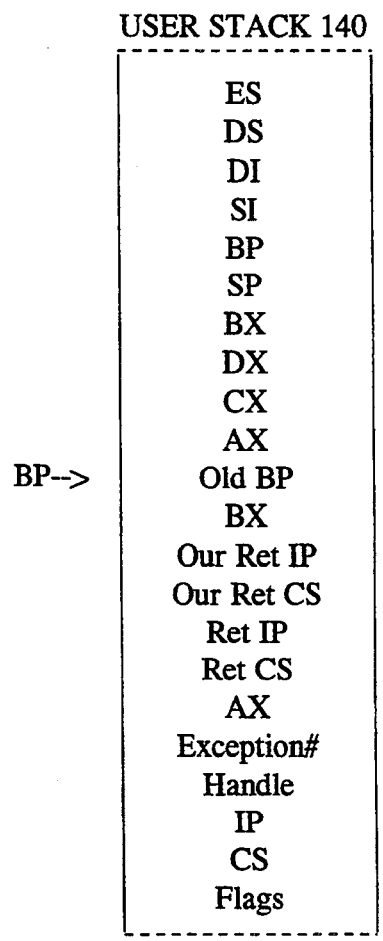
FIG. 9 depicts an example user stack that is used in the preferred embodiment described herein.

The DPMI services 37 (FIG. 3) seek to restart the instruction that has failed because the DPMI services believe the interrupt has been fully handled. However, the CS and IP values on the DPMI stack 134 have been changed to point to the restart location in the hook manager 38. As such, the DPMI services cause execution to begin again at the restart point. Before returning to the hook manager, the DPMI services perform housekeeping on the DPMI stack 134 (FIG. 8). The hook manager then saves the register values onto the user stack shown in FIG. 9 (step 129 in FIG. 7). The ES, DS, DI, SI, BP, SP, BX, DX, CX and AX registers values are pushed onto the user stack 140. The user stack 140 already holds the old BP, BX, Ret IP, Ret CS, IP, CS and FLAGS values from when the DPMI stack values were pushed onto the stack (see step 122 in FIG. 7). At this point, the hook manager proceeds to build the new standardized stack (step 131 in FIG. 7).

Figure 10:
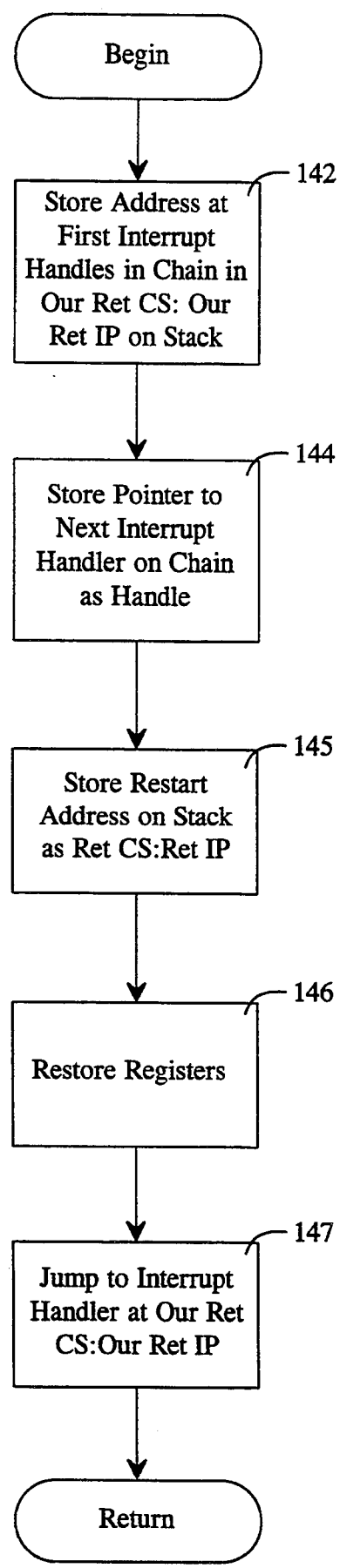
FIG. 10 is a flowchart depicting the steps performed by the hook manager of the preferred embodiment described herein immediately before passing an interrupt to the interrupt handler on the system interrupt chain.

The hook manager 38 (FIG. 3), in building the standardized stack, performs steps that are performed for all types of interrupts (that is, regardless of whether the interrupt was hooked through the DPMI services 37 or the MS-DOS services 39 and regardless of whether the operating system is running in standard mode or enhanced mode). FIG. 10 shows a flowchart of the steps performed in this section of the hook manager. First, the hook manager 38 (FIG. 3) obtains the address i.e., CS:IP of the first interrupt handler on the system interrupt chain and stores this address on the user stack 140 (FIG. 9) as "Our Ret IP" and "Our Ret CS" (step 142 in FIG. 10). The hook manager then stores a pointer to the next interrupt handler on the system interrupt chain on the user stack 140 (FIG. 9) as "Handle" (step 144 in FIG. 10).

The hook manager 38 (FIG. 3) stores a restart address on the user stack 140 (FIG. 9) as "Ret CS" and "Ret IP" (step 145 in FIG. 10). The restart address specifies where the hook manager is to resume execution if the first interrupt handler on the chain returns to the hook manager (such as when the first interrupt handler does not wish to service the interrupt). The hook manager next restores the registers that were previously stored on the user stack so as to restore the previous state (step 146). The hook manager subsequently passes control to the interrupt handler at the address specified by Our Ret CS:Our Ret IP (step 147). Thus, the first interrupt handler on the system interrupt chain begins execution and has an opportunity to process the system interrupt with knowledge of the state when the interrupt occurred. The stack frame passed to the interrupt handler is optimized such that if the interrupt handler does not wish to service the interrupt, the interrupt handler need only execute a return instruction. Thus, handling of by application programs is simplified.

Figure 11:
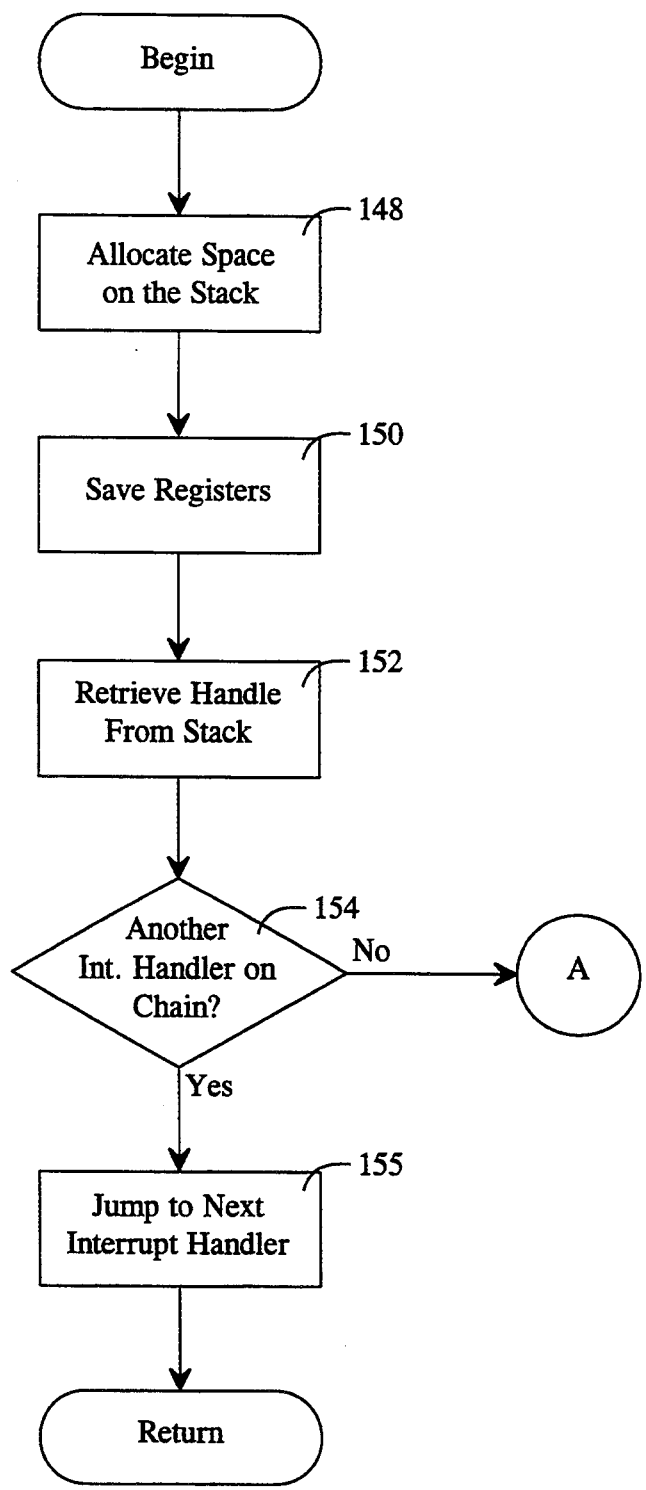
FIG. 11 is a flowchart depicting the steps performed by the hook manager of the preferred embodiment described herein upon return from an interrupt handler on the system interrupt chain.

FIG. 11 depicts the steps that are executed by the hook manager 38 (FIG. 3) when an interrupt handler returns control back to the hook manager at the restart address. The hook manager allocates space on the user stack (step 148) and saves the current register values so as to preserve the current state (step 150). The hook manager then retrieves the Handle from the stack, which specifies the address of the next interrupt handler on the system interrupt chain (step 152). The hook manager checks to see whether there is another interrupt handler on the system interrupt chain that was hooked through the hook manager (step 154). It should be noted that there may be other interrupt handlers on the system interrupt chain which were not hooked through the hook manager. If there is an additional interrupt handler on the system interrupt chain that was hooked through the hook manager, the hook manager passes the interrupt to the next interrupt handler (step 155) by again executing the steps set forth in FIG. 10. In contrast, if there is not an additional interrupt handler on the system interrupt chain that was hooked through the hook manager, the system begins execution of the steps set forth in FIG. 12.

Figure 12:
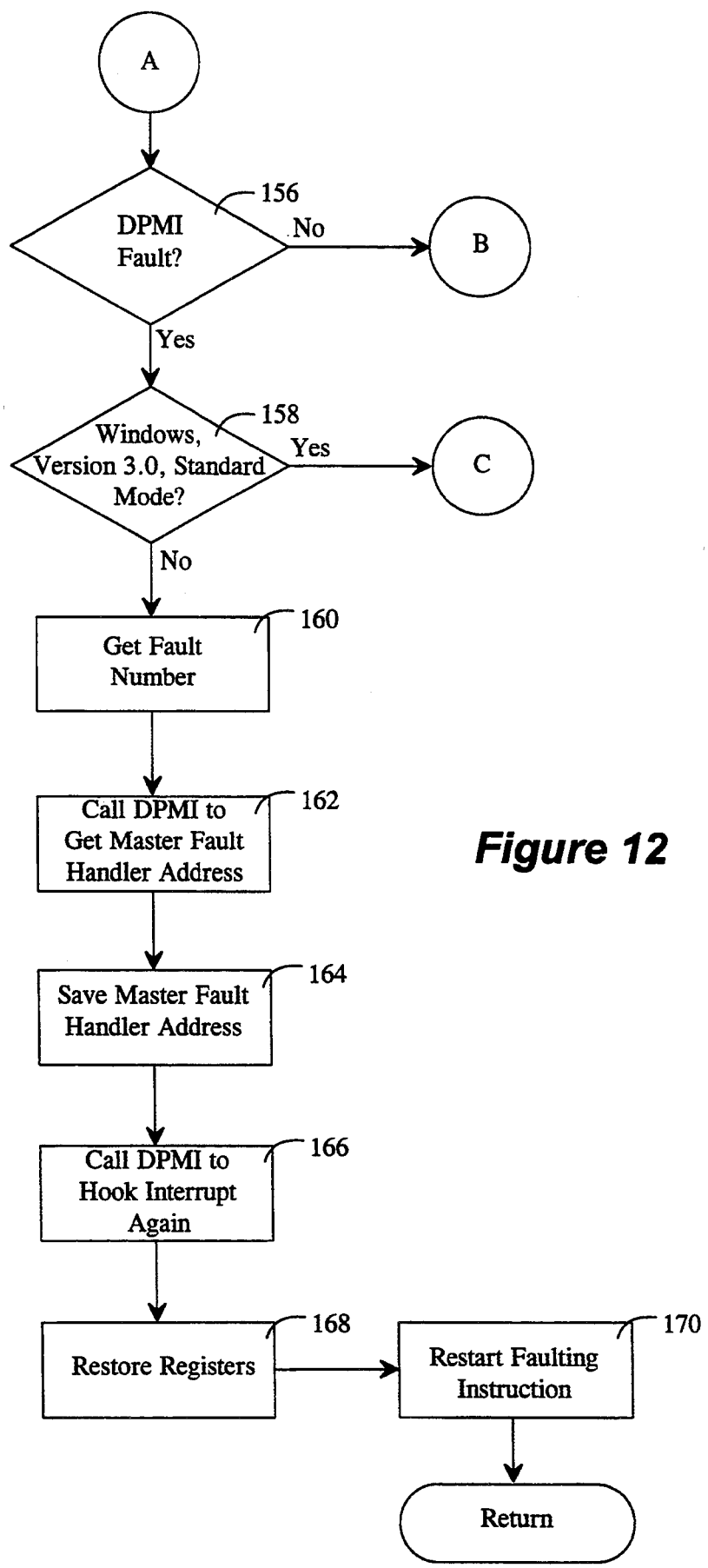
FIG. 12 is a flowchart depicting the steps performed by the hook manager of the preferred embodiment described herein when there are no additional interrupt handlers on the system interrupt chain that were hooked through the hook manager.
Figure 14:
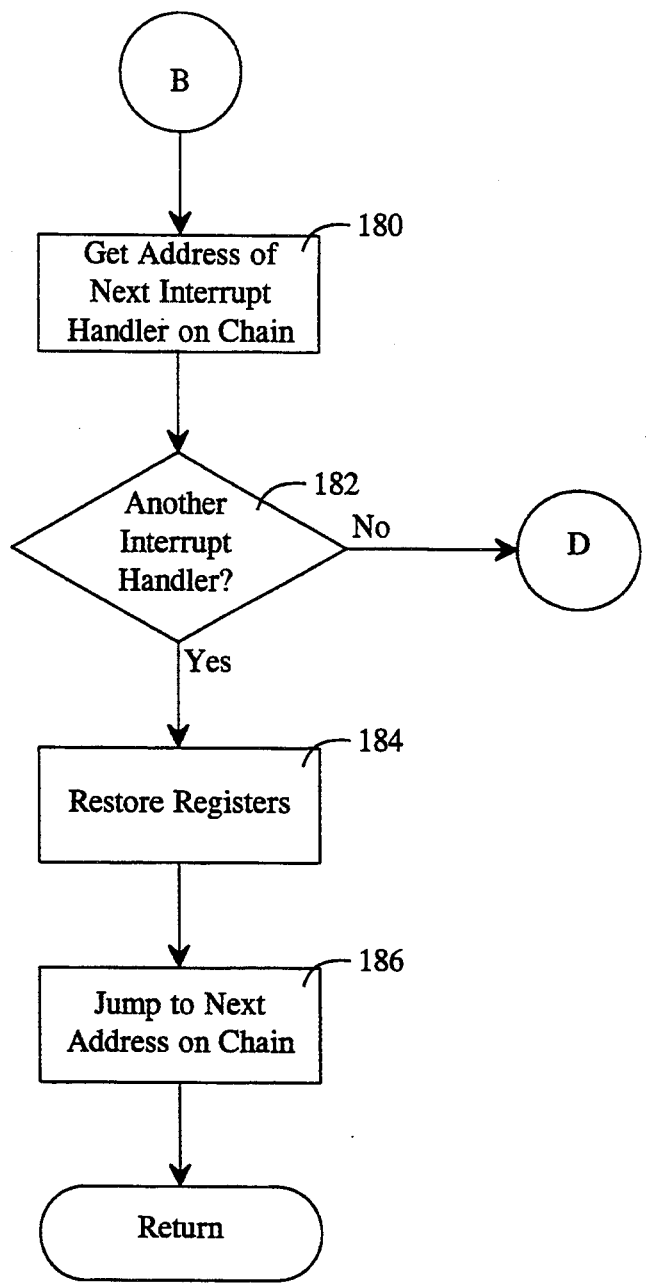
FIG. 14 is a flowchart depicting the steps performed by the hook manager of the preferred embodiment described herein when there are no additional interrupt handlers on the system interrupt chain which were hooked through the hook manager and the system interrupt was hooked through MS-DOS services.

When an additional interrupt which was hooked through the hook manager is not found (see step 154 of FIG. 11), the hook manager 38 (FIG. 3) first checks to see whether the interrupt was hooked "through the DPMI services 37 (step 156 in FIG. 12). If the interrupt was not hooked through the DPMI services but rather was hooked through the MS-DOS services 39 (FIG. 3), the steps set forth in FIG. 14 are performed. These steps will be described in more detail below. Ifr however, the interrupt was hooked through DPMI services, the system checks to see whether the processor is running WINDOWS, version 3.0, standard mode (step 158 in FIG. 12). If the operating system is running in standard mode, the hook manager performs the steps set forth in FIG. 15. These steps will also be described in more detail below. On the other hand, if the system is not executing in WINDOWS, version 3.0, standard mode, the hook manager knows that it is dealing with a conventional DPMI-hooked interrupt and proceeds to perform the remaining steps shown in FIG. 12.

In the remaining steps of FIG. 12, the hook manager 38 (FIG. 3) first gets the fault number that caused the system interrupt (step 160 in FIG. 12). It then calls the DPMI services 37 (FIG. 3) to get the master fault handler address of the hook manager (step 162 in FIG. 12) and saves the master fault handler address (step 164 in FIG. 12). The hook manager then hooks the interrupt that caused the fault again (step 166), so that the hook manager has two hooks to the same interrupt. The registers are then restored to restore the previous state (step 168) and the faulting instruction is restarted (step 170). As a result, the original fault occurs again and the doubly hooked master fault handler grabs the fault.

Figure 13:
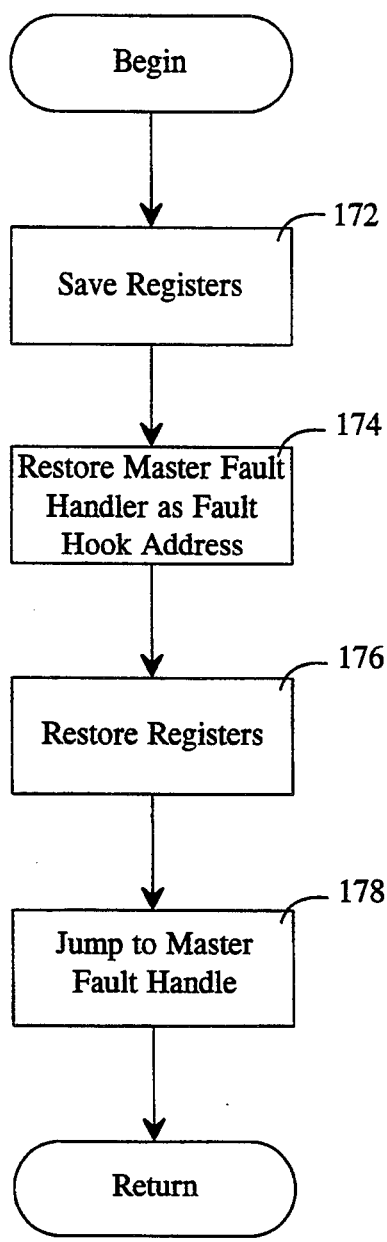
FIG. 13 is a flowchart depicting the steps performed by the hook manager of the preferred embodiment described herein when a fault is purposely caused again.

When the fault occurs again, the hook manager 38 (FIG. 3) begins execution and executes the steps shown in FIG. 13. The registers are saved (step 172), and the address of the master fault handler is restored as the fault hook address (step 174). The registers are then restored (step 176), and the system jumps to the master fault handler 58 (FIG. 3) on the system interrupt chain (step 178 in FIG. 13).

Figure 16:
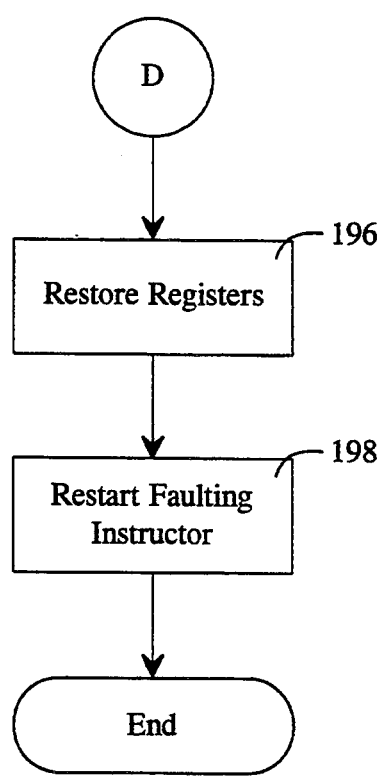
FIG. 16 is a flowchart of the steps performed by the hook manager of the preferred embodiment described herein when the system interrupt is hooked through MS-DOS services and there are no remaining interrupt handlers on the system interrupt chain.

As noted above in the discussion of the flowchart of FIG. 12, if the interrupt is hooked through the MS-DOS services 39 (FIG. 3), the hook manager 38 performs the steps shown in FIG. 14. Specifically, the hook manager seeks the address of the next interrupt handler on the system interrupt chain (step 180). The hook manager determines if there is another interrupt handler on the system interrupt chain (step 182). If there is another interrupt handler, the registers are restored from the stack (step 184) and the system jumps to the next interrupt handler (step 186), so that the interrupt is passed onto the next interrupt handler on the chain. In contrast, if there is not another interrupt handler on the system interrupt chain, the steps shown in FIG. 16 are performed. In particular, the registers are restored (step 196) and the faulting instruction is restarted (step 198). The steps depicted in FIG. 16 are only performed when there is no MS-DOS interrupt handler for a fault. Thus, the operating system restarts the fault and hopes that the user can intervene and kill the application.

Figure 15:
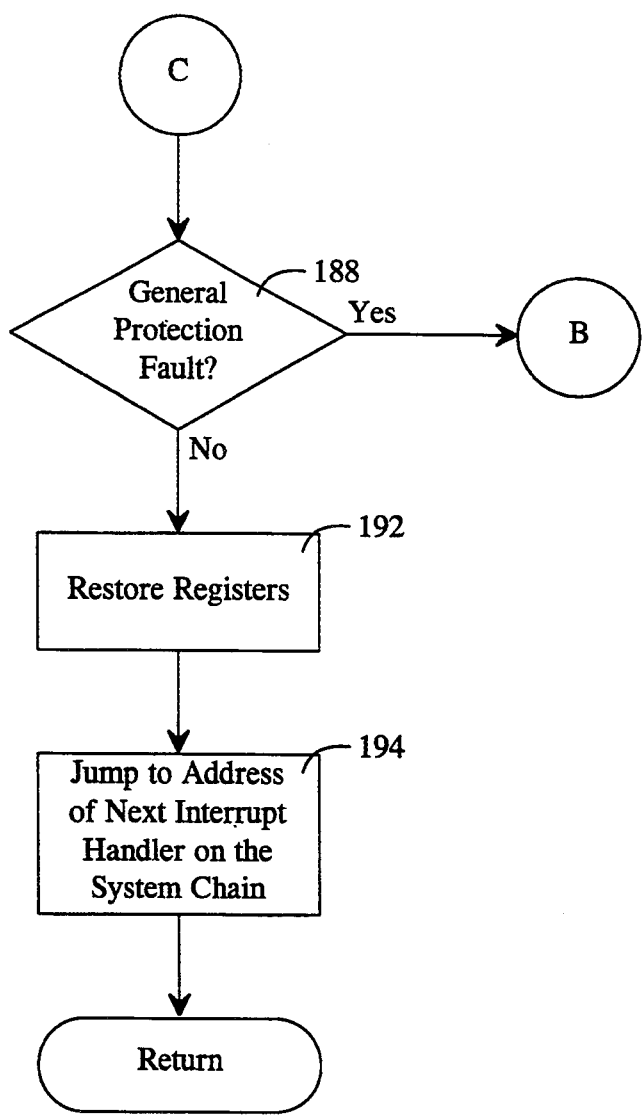
FIG. 15 is a flowchart depicting the steps performed by the hook manager of the preferred embodiment described herein when there are no additional interrupt handlers on the system interrupt chain that were hooked through the hook manager and the operating system is WINDOWS, version 3.0, standard mode.

As was also mentioned in the discussion of FIG. 12 above, if the operating system is WINDOWS, version 3.0, standard mode and the fault was hooked through DPMI services, the steps depicted in FIG. 15 are performed. In the steps shown in FIG. 15, the hook manager 38 (FIG. 3) checks to see whether the system interrupt was caused by a general protection fault (step 188). If the system interrupt was caused by a general protection fault, the hook manager proceeds to perform the steps depicted in FIG. 14 (which were described above). If, however, the system interrupt was not caused by a general protection fault, the values of the registers stored on the user stack are then restored (step 192). The hook manager jumps to the address of the next interrupt handler on the system interrupt chain (step 194). This interrupt handler will be in the WINDOWS, version 3.0, standard mode kernel.

Hence, using the above-described preferred embodiment of the present invention, hooks for system interrupts by application programs may be hooked and unhooked in any order. Further, when the interrupt is hooked by the DPMI services, an instruction may be restarted without returning to DPMI services. In addition, by providing a standardized stack frame that includes state information for the interrupt program from the time of the interrupt, the interrupt handler code may use the state information in servicing the interrupt.

While the present invention has been described with reference to a preferred embodiment thereof, those skilled in the art will know of various changes in form and scope that may be made without departing from the spirit of the invention as defined in the appended claims.

We claim:

1. In a data processing system having a memory for holding a dynamic-link library, a user stack that is used by application programs and a processor for executing the application programs, a method comprising the steps of:

a) providing a hook manager in the dynamic-link library for managing hooking and unhooking of system interrupts for the application programs;
b) hooking a first interrupt to the hook manager;
c) manipulating the user stack so that the stack may be used by any of the application programs; and
d) passing the first interrupt to one of the application programs.

2. A method as recited in claim 1 wherein the step of manipulating the stack further comprises the step of copying additional information into the stack.

3. A method as recited in claim 1 wherein the hook manager includes an application program interface (API) that is called by at least one of the application programs to receive system interrupts and an API that is called by at least one of the application programs to no longer receive system interrupts.

4. In a data processing system, a method comprising the steps of:
a) interrupting an executing application program with a system interrupt;
b) determining a type of the system interrupt;
c) determining a first interrupt handler on a system interrupt chain to receive the system interrupt;
d) determining a second interrupt handler on the system interrupt chain to receive the system interrupt if the first interrupt handler returns the system interrupt;
e) storing the type of the system interrupt and an address for accessing the second interrupt handler on a stack of the first interrupt handler; and
f) passing the system interrupt to the first interrupt handler.

5. A method as recited in claim 4, further comprising the step of providing a hook manager that includes a function that may be called to add an interrupt handler to the system interrupt chain.

6. A method as recited in claim 5 wherein the hook manager is a dynamic-link library module.

7. A method as recited in claim 6 wherein the function is an application program interface (API).

8. A method as recited in claim 4, further comprising the step of removing the first interrupt handler from the system interrupt chain.

9. A method as recited in claim 4, further comprising the steps of:
returning the system interrupt from the first interrupt handler; and
passing the system interrupt to the second interrupt handler.

10. In a data processing system running an operating system and first and second application programs, a method comprising the steps of:
a) providing a hook manager in a dynamic-link library for managing hooking and unhooking of interrupts by the application programs, said hook manager maintaining a chain of hooks;
b) adding a hook for the first application program to the hook chain using the hook manager;
c) subsequently adding a hook for the second application program to the hook chain using the hook manager;
d) unhooking the hook for the first application program from the hook chain using the hook manager; and
e) subsequently unhooking the hook for the second application program from the hook chain using the hook manager.

11. In a data processing system running an operating system and application programs, a method comprising the steps of:
a) providing a hook manager in a dynamic-link library for hooking and unhooking of system interrupts by the application programs;
b) building a chain of hooks using the hook manager in response to requests by the application programs to receive system interrupts, said chain being built in sequential order based on when the requests are received; and
c) unhooking the hooks from the chain in a non-last-in-first-out (non-LIFO) fashion.

12. In a data processing system having a processor and registers, a method comprising the steps of:
a) interrupting an application program running on the processor with a system interrupt;
b) hooking the interrupt to a hook manager through system services, said system services having a stack for storing information;
c) copying state information for the application program to the system services stack using the hook manager;
d) copying the state information for the application program from the system services stack to a stack for a first interrupt handler; and
e) passing the system interrupt to the first interrupt handler.

13. A method as recited in claim 12 wherein the step of copying state information for the application program to the system services stack, further comprises the step of copying values of the registers to the system services stack.

14. A method as recited in claim 12 wherein the step of copying state information for the application program to the system services stack, further comprises the step of copying values of local variables for the application program to the system services stack.

15. A method as recited in claim 12, further comprising the step of providing a system interrupt chain of interrupt handlers that wish to receive system interrupts, said chain including the first interrupt handlers.

* * * * *